US012038821B2

(12) United States Patent
Osaki

(10) Patent No.: US 12,038,821 B2
(45) Date of Patent: Jul. 16, 2024

(54) ALERT RULE MANIPULATION IN SYNC OF TEMPORARY CONFIGURATION CHANGE

(71) Applicant: Hitachi, Ltd., Tokyo (JP)

(72) Inventor: Hiroyuki Osaki, Los Gatos, CA (US)

(73) Assignee: HITACHI, LTD., Tokyo (JP)

( * ) Notice: Subject to any disclaimer, the term of this patent is extended or adjusted under 35 U.S.C. 154(b) by 30 days.

(21) Appl. No.: 17/955,275

(22) Filed: Sep. 28, 2022

(65) Prior Publication Data

US 2024/0103992 A1 Mar. 28, 2024

(51) Int. Cl.
*G06F 11/00* (2006.01)
*G06F 11/30* (2006.01)
*G06F 11/32* (2006.01)

(52) U.S. Cl.
CPC ........ *G06F 11/327* (2013.01); *G06F 11/3034* (2013.01); *G06F 11/3051* (2013.01)

(58) Field of Classification Search
CPC ............ G06F 11/3034; G06F 11/3051; G06F 11/327; G06F 11/32; G06F 11/3442; G06F 11/0781; H04L 41/06–065
See application file for complete search history.

(56) References Cited

U.S. PATENT DOCUMENTS

| 2006/0073822 A1* | 4/2006 | Orton | H04L 41/0627 340/506 |
| 2014/0330756 A1* | 11/2014 | Thapliyal | G06N 5/025 706/47 |
| 2015/0379864 A1* | 12/2015 | Janchookiat | G06F 11/327 340/506 |
| 2018/0217888 A1 | 8/2018 | Colgrove et al. | |
| 2021/0366268 A1* | 11/2021 | Jain | H04L 41/0823 |
| 2023/0105150 A1* | 4/2023 | Zuchlewski | G06F 9/485 719/318 |

OTHER PUBLICATIONS

Xu, Xiwei et al., Crying Wolf and Meaning it: Reducing False Alarms in Monitoring of Sporadic Operations through POD-Monitor, 2015, IEEE (Year: 2015).*
Dullmann, Thomas F., Performance Anomaly Detection Microservice Architectures Under Continuous Change, 2017, University of Stuttgart (Year: 2017).*

* cited by examiner

*Primary Examiner* — Marc Duncan
(74) *Attorney, Agent, or Firm* — Procopio, Cory, Hargreaves & Savitch LLP

(57) ABSTRACT

Systems and methods described herein involve a storage system and one or more devices associated with the storage system, the one or more devices external to the storage system, which can include managing a configuration rule difference mapping information that maps configuration detection filter information and required rule manipulation responsive to the configuration detection filter information, the required rule manipulation indicative of a modification to alert properties of the storage system; for detection of a configuration change to the one or more devices based on the configuration detection filter information, identifying one or more rule manipulations from the required rule manipulation information from the configuration rule difference mapping information, and generating a rule manipulation draft to modify the alert properties of the storage system based on the required rule manipulation.

11 Claims, 13 Drawing Sheets

| Configuration file version | Detection filter | | | Rule manipulation expression | | | Proof of occurrence |
|---|---|---|---|---|---|---|---|
| | Config type | Change location | Change value | Alert type | Manipulation location | Manipulation location | |
| A0000002 | Type: Application applicationName: WeekendBatchjob | .spec.replicas | Increase by 2 or more (temporary scaleout) | AlertName: LowCapacityAlert | Alert Level | HIGH -> LOW | 1 Day |
| | | | | AlertName: PowerUsageAlert | Rule[name:dailyThreshold].counterThreshold | Increase by 100 | |
| A1111111 | type: NetworkSwitch | .spec.status | .-> Planned TemporaryShut down | AlertName: NetworkTimeout | Alert Level | HIGH -> LOW | 2 Days |
| A2222222 | type: PowerSystem | .spec.power | On -> Off | AlertName: AvailabilityLimit | Alert Level | HIGH -> LOW | 3 Hour |
| A3333333 | type: CloudService | .status | .-> UnderMaintenance | AlertName: ExternalServiceNot Available | Alert Level | HIGH -> LOW | 1 Hour |

FIG. 6

| Repository Name | Repository URL | Credential | Affected Storage Devices |
|---|---|---|---|
| ApplicationConfigurationRepo | http://github.com/xxx/yyy | User: xyz, Password: abc | Device1 |
| ApplicationConfigurationRepo | http://zzz.com/aaa/bbb | AccessToken: abcde | Device2, Device3, Device4 |
| NetworkConfigurationRepo | http://ccc/ddd/eee | AccessToken: fghij | . |
| PowerConfigurationRepo | http://fff/ggg/hhh | N/A | . |
| CloudServiceConfigurationRepo | protocol://iii/jjj/kkk | N/A | . |

FIG. 9

ALERT RULE MANIPULATION IN SYNC OF TEMPORARY CONFIGURATION CHANGE

BACKGROUND

Field

The present disclosure is generally related to information technology (IT) systems, and more specifically, for IT systems which include storage devices and applications.

Related Art

There are two different types of administrators: storage admin and site reliability engineer. These two types of admins operate different tools.

Storage admin is a person in charge of monitoring permanent health degradation of storage device. Storage admin monitors specific alerts coming from storage devices such as "lack of capacity" alert or "network connection failure" alert. After detecting these alerts, in order to maintain permanent health of storage devices, storage admin conducts required actions to remediate alert status such as "addition of capacity" or "network setting change" of storage devices.

Storage devices also raise alerts not related to permanent health. For this sake, storage admin uses alert monitoring tools and implements alert rules. Alert monitoring tools label at a high-level to provide selective alerts as defined in alert rules. The label is necessary to detect the permanent health degradation, but is not sufficient. It is difficult to determine whether alerts are caused by a temporary situation or permanent health degradation from the alert labels.

The site reliability engineer (SRE) is in charge of controlling devices other than storage devices such as servers, networks, power systems and applications running on servers. SRE manages configuration and changes configuration on these devices. It can be permanent or temporary (192-1, 192-2). Temporary change can include changes such as temporary scale-out of applications.

Temporary changes 192-2 made by the SRE can cause an increase of storage device alerts, which is called alert storms 193. For example, a temporary "application setting" change during just one day causes a temporary storage device usage increase. Such a setting may cause "lack of capacity" alerts raised from storage devices during the day. This is the same alert type as the alerts caused by permanent health degradation. But these SRE changes do not affect the permanent health of storage devices. When alert storms occur, the storage admin receives too many emails or notifications about these alerts. The storage admin has to check all these notifications and set "unimportant" flags to identify that these notifications are due to just temporary change and not so important.

In order to avoid an alert storm, the storage admin must decrease the number of alerts by manipulating some rules on alert monitoring tools. These manipulations can include a downgrade of alert levels or a change of thresholds to trigger alerts.

These manipulations are temporary because SRE-induced temporary changes are subject to be reverted at some point. For example, if there is a change to the temporary application scale-out to change a number of application processes from 2 to 10, one day after the change occurs, it will be reverted. When the said rule manipulation takes place right after the temporary change, the reversion of the rule manipulation should also be done.

FIG. 1 shows how the rule manipulation should be done after the temporary change. After SRE makes temporary change 192-2, some changes occur in the servers, networks or power systems. Then, storage devices are affected by this change in many ways. For example, storage devices face resource shortage (e.g., pool capacity). Then the devices raise multiple alerts (e.g., "PoolCapacityAlert"). Alert monitoring tool receives these alerts and labels as "HIGH" according to the rules. Then, storage admin receives many alerts labeled as "HIGH". To avoid an alert storm, the storage admin should do a rule manipulation. The rule in alert monitoring tool has to be modified from "HIGH" to "LOW". After the manipulation, these alerts are labeled as "LOW". So the storage admin receives fewer "HIGH" alerts.

In the related art, there is a method for dynamical adjusting an amount of log data generated from the storage system. Such related art implementations automatically change the log level of new components in the storage device systems. Further, the log level can be managed by the determination system based on device characteristics. The device characteristics includes aspects such as whether storage has experienced an error within a predetermined period of time, the number of requests, amount of data transferred, and average response time.

SUMMARY

FIG. 2 is a diagram showing issues resulting in the related art. Related art implementations cannot take information outside storage devices into consideration, a problem that storage admin cannot avoid alert storms caused by temporary change occurs. To suppress alert storms, it is important to judge whether the causal situation is temporary or not. If a storage device raises too many alerts about the lack of capacity, it can be temporary or permanent. If permanent, it must be classified as high-severity, and it must be reported to the storage admin. But whether the situation is temporary or not cannot be judged from information inside storage devices. To make the judgment, knowledge of SRE and storage admin is required. First, SRE needs to judge if the change is temporary (291). This judgement requires the information about a root cause business event provoking the change from the SRE. Moreover, the storage admin needs to judge whether rule manipulation is needed or not during the said temporary change.

One example of a temporary change is a temporary application scale-out by SRE during a holiday season. SRE put a change of scale-out only during holiday season. It causes new additional capacity usage on storage devices, then "lack of capacity" alerts from storage devices increase. After holiday season, the scale-out will be reverted and "lack of capacity" alerts decrease. Storage admin has to check if the alert storm is not related to permanent health of storage devices, and the causal situation is just temporary only for holiday season. For this sake, storage admin also has to consult SRE about what the causal situation is. In order to judge whether the causal situation is temporary, the information about what configuration changed and what time the SRE change occurs are important. This information is from the SRE configuration database outside the storage device. The related art implementations only utilizes storage characteristics, but it does not utilize SRE information.

Further, the storage admin has to check (292) if the alert rule must be manipulated or not, and the storage admin has to manipulate the alert level or the threshold in an alert rule located in an alert monitoring tool (192-21, 192-22). After the rule manipulation, the alert storm will be suppressed. Information about which type of rule manipulation is required in response to the causal situation is also important. However, the related art implementation does not utilize these kinds of information either.

Another issue is that the related art implementations cannot detect configuration changes at the timing of its occurrence outside storage devices. The related art implementation cannot either provide right judgement at right timing when alert storm should be avoided.

Another problem is that after configuration/operation changes are reverted, the related art cannot provide the necessity of rule manipulation in sync with configuration revert. This may cause another issue to increase false negative and storage admin cannot detect right alerts after reverts.

The example implementations described herein are directed to systems and methods to address the above issues. The example implementations introduce a new component "rule manipulator" which automatically judge the necessity of rule manipulation. First, the rule manipulator detects the configuration changes. Next, the rule manipulator judges whether configuration changes are temporary or not, and what type of rule manipulation is required.

FIG. 3 shows the overview of the system, in accordance with an example implementation. The rule manipulator gets configuration change events outside storage devices and determine the necessity of rule manipulation when it meets the detection filter's condition that is defined in the config-rule diff mapping table in advance. The rule manipulator also outputs new rule draft including manipulations. By applying the new rule draft to alert monitoring tools automatically or after some approval process, the alert monitoring tools decrease some alerts and prevent alert storms.

This process is done by automatically by the rule manipulator without any human interaction. The rule manipulator can be integrated with existing configuration store which stores configuration files from the SRE. All changes in configuration store can be detected by rule manipulation by Application Programming Interface (API) or webhook mechanism.

Aspects of the present disclosure can involve a method for a system involving a storage system and one or more devices associated with the storage system, the one or more devices external to the storage system, the method including managing a configuration rule difference mapping information that maps configuration detection filter information and required rule manipulation responsive to the configuration detection filter information, the required rule manipulation indicative of a modification to alert properties of the storage system; for detection of a configuration change to the one or more devices based on the configuration detection filter information, identifying one or more rule manipulations from the required rule manipulation information from the configuration rule difference mapping information, and generating a rule manipulation draft to modify the alert properties of the storage system based on the required rule manipulation.

Aspects of the present disclosure can involve a computer program, storing instructions for a system involving a storage system and one or more devices associated with the storage system, the one or more devices external to the storage system, the method including managing a configuration rule difference mapping information that maps configuration detection filter information and required rule manipulation responsive to the configuration detection filter information, the required rule manipulation indicative of a modification to alert properties of the storage system; for detection of a configuration change to the one or more devices based on the configuration detection filter information, identifying one or more rule manipulations from the required rule manipulation information from the configuration rule difference mapping information, and generating a rule manipulation draft to modify the alert properties of the storage system based on the required rule manipulation. The computer program and instructions can be stored in a non-transitory computer readable medium and executed by one or more processors.

Aspects of the present disclosure can involve a system involving a storage system and one or more devices associated with the storage system, the one or more devices external to the storage system, the system including means for managing a configuration rule difference mapping information that maps configuration detection filter information and required rule manipulation responsive to the configuration detection filter information, the required rule manipulation indicative of a modification to alert properties of the storage system; for detection of a configuration change to the one or more devices based on the configuration detection filter information, means for identifying one or more rule manipulations from the required rule manipulation information from the configuration rule difference mapping information, and means for generating a rule manipulation draft to modify the alert properties of the storage system based on the required rule manipulation.

Aspects of the present disclosure can involve a computing device for a system involving a storage system and one or more devices associated with the storage system, the one or more devices external to the storage system, the computing device including a processor configured to manage a configuration rule difference mapping information that maps configuration detection filter information and required rule manipulation responsive to the configuration detection filter information, the required rule manipulation indicative of a modification to alert properties of the storage system; for detection of a configuration change to the one or more devices based on the configuration detection filter information, identify one or more rule manipulations from the required rule manipulation information from the configuration rule difference mapping information, and generate a rule manipulation draft to modify the alert properties of the storage system based on the required rule manipulation.

BRIEF DESCRIPTION OF DRAWINGS

FIG. 6 is an example implementation of config-rule diff mapping table 319.

FIG. 7 shows the flow diagram process for rule manipulation process 406, in accordance with an example implementation.

FIG. 8 shows the flow diagram process for the filter generation process 401, in accordance with an example implementation.

FIG. 9 is a diagram showing repository setting 329, in accordance with an example implementation.

DETAILED DESCRIPTION

Figure 1:
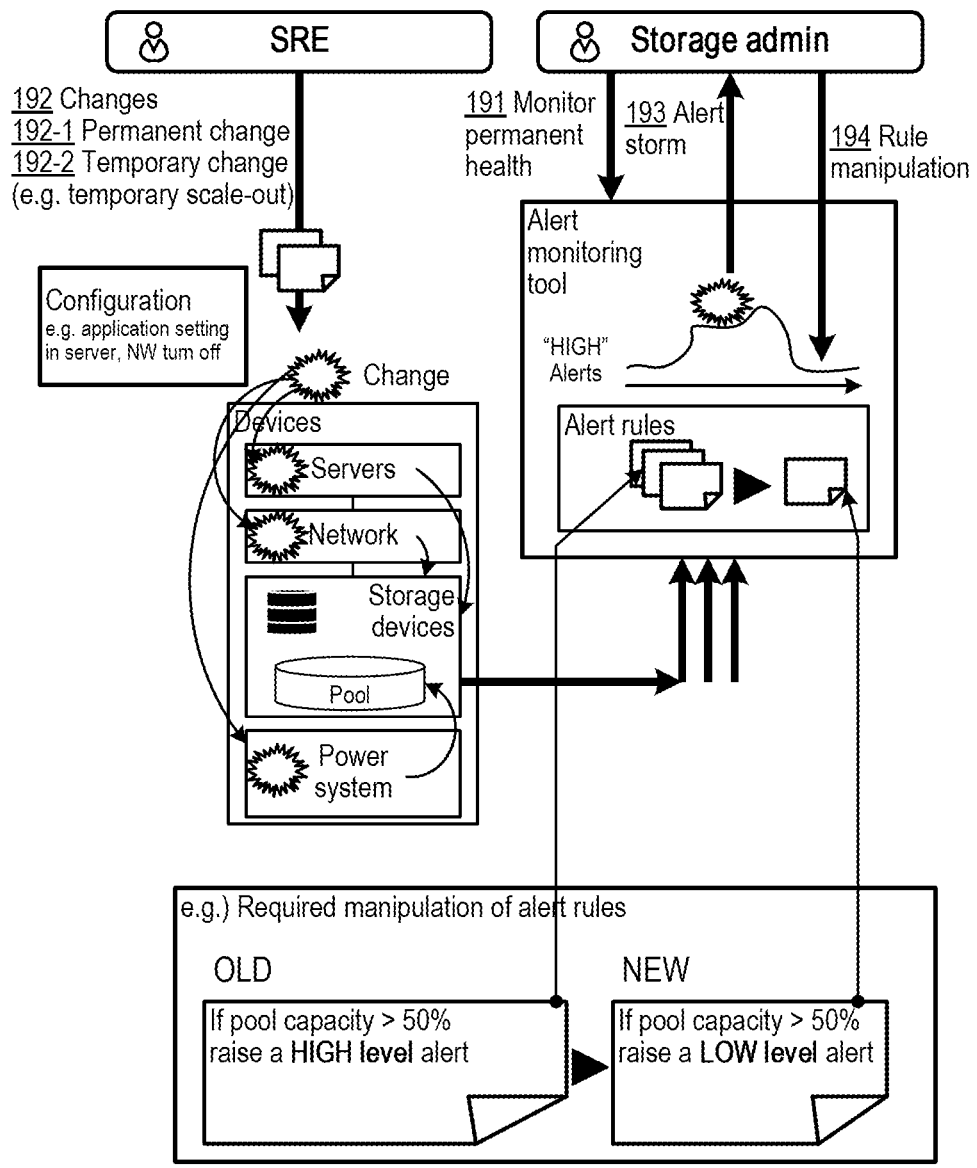
FIG. 1 is a diagram showing how the rule manipulation should be done after the temporary change.
Figure 2:
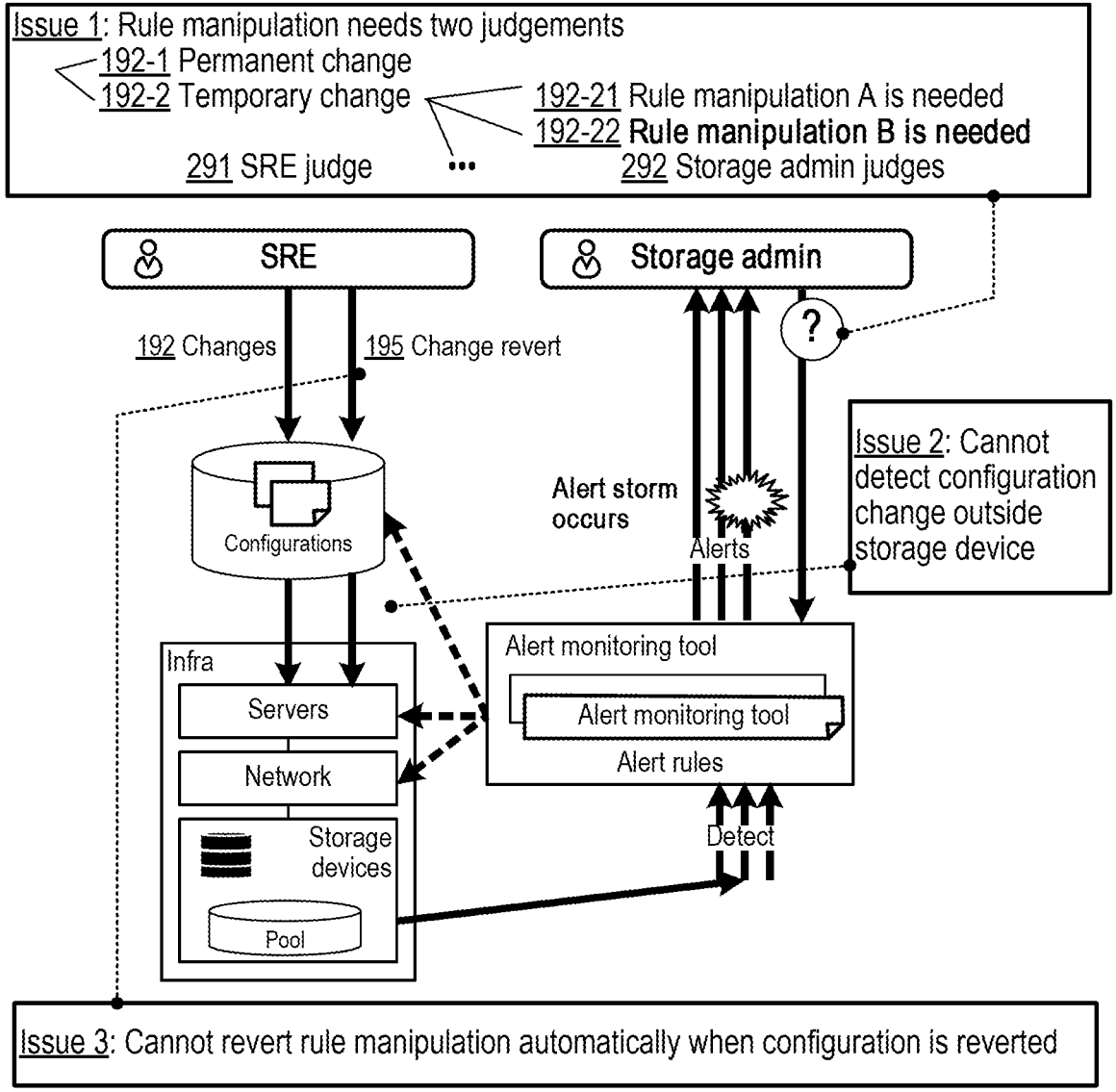
FIG. 2 is a diagram showing issues resulting in the related art.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 4:
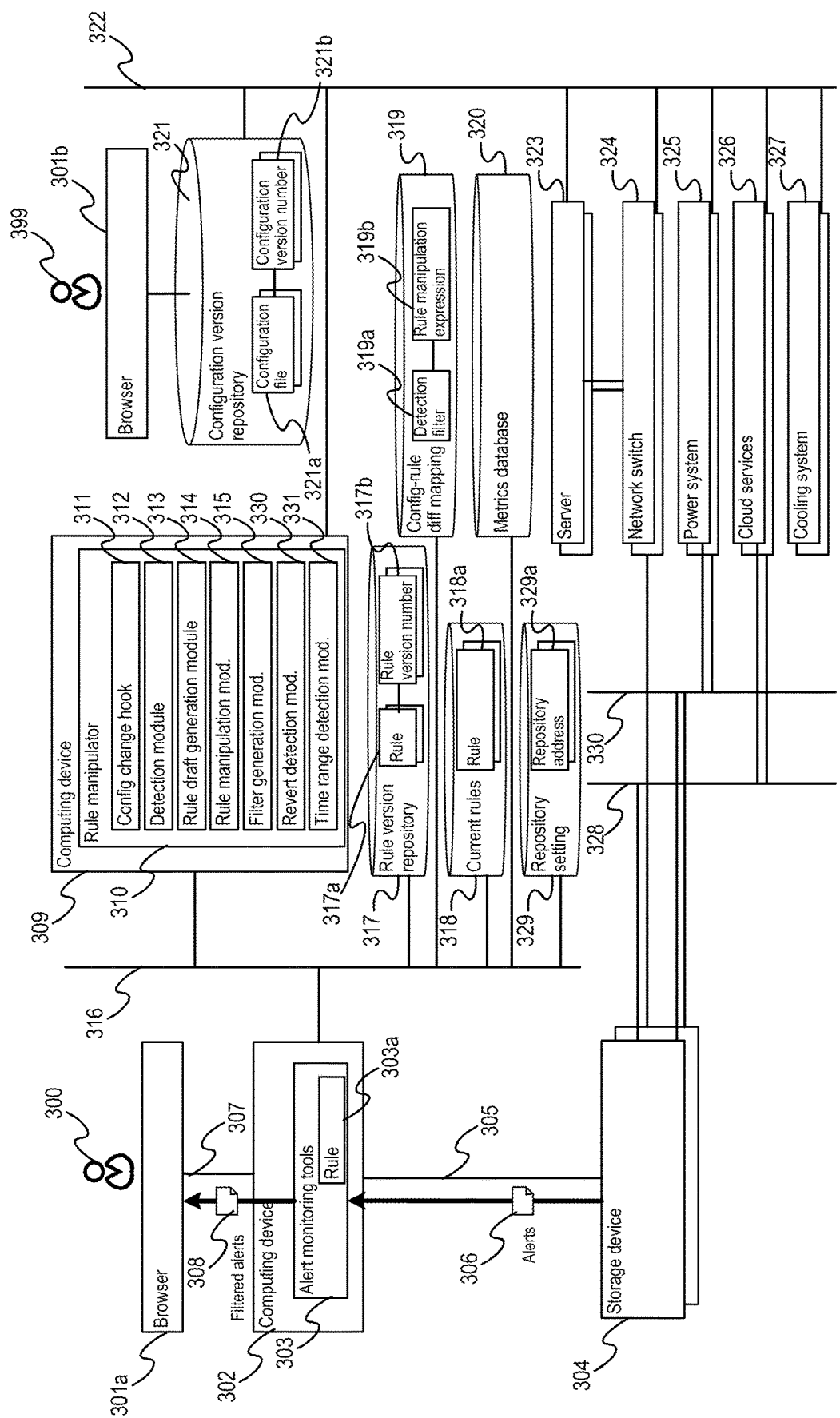
FIG. 4 is a diagram showing the example implementation of rule manipulation systems in which a rule manipulator is integrated with configuration version repository used by SRE.

IT system has the configuration version repository used by SRE and stores configuration files. FIG. 4 shows the example implementation of rule manipulation systems in which a rule manipulator is integrated with configuration version repository used by SRE.

The rule manipulation system can be used by storage admin 300 and SRE 399. The rule manipulation system can include browsers 301a and 301b which is used by storage admin 300 and SRE 399 respectively. The rule manipulation system can include computing device 302 which runs alert monitoring tools 303. Alert monitoring tools store rule 303a to define which alert is labeled at a high-level. Computing device 302 is connected to storage devices 304 with connection 305. Storage devices raise alerts 306 and sends them to alert monitoring tool 303. Then, alert monitoring tool 303 labels the said alert as a high-level or a low-level, and send it to browser 301a. Rule 303a is fetched from rule 318a.

The rule manipulation system can include computing device 309 which runs rule manipulator program 310. Rule manipulator 310 can include config change hook 311, detection module 312, rule draft generation module 313, rule manipulation module 314, filter generation module 315, revert detection module 330, and time range detection module 331. The computing device 309 is connected with computing device 302 via network 316. Multiple databases such as rule version repository 317, current rules 318, config-rule diff mapping 319, metrics database 320, and repository setting 329 can be connected to network 316 as well. Rule version repository has pairs of rule 317a and rule version number 317b. Current rules 318 has rule 318a. Config-rule diff mapping 319 has combinations of detection filter 319a and rule manipulation expressions 319b. Repository setting has repository address 329a.

The rule manipulation system can include configuration version repository 321 which contains pairs of configuration file 321a and configuration version number 321b. Via network 322, configuration version repository 321 is connected to multiple devices such as servers 323, network switch 324, power system 325, cloud services 326, and cooling system 327. Configuration file 321a is meant to describe a desired status of multiple devices such as server 323 and so on. The configuration file 321a is sent to server 323 or other devices, and can be used to change configuration of devices.

The devices from 323 to 327 are directly or indirectly connected to storage device 304. Network switch 324 and cloud service 326 can be connected to storage device 304 via network 328. Power systems 325 is connected to storage device 304 via power cable 330. Cooling system 327 is not connected by any network or cable with storage device 304, but cooling system 327 is located at the same room with storage device 304 and shares controlled air each other.

Figure 5:
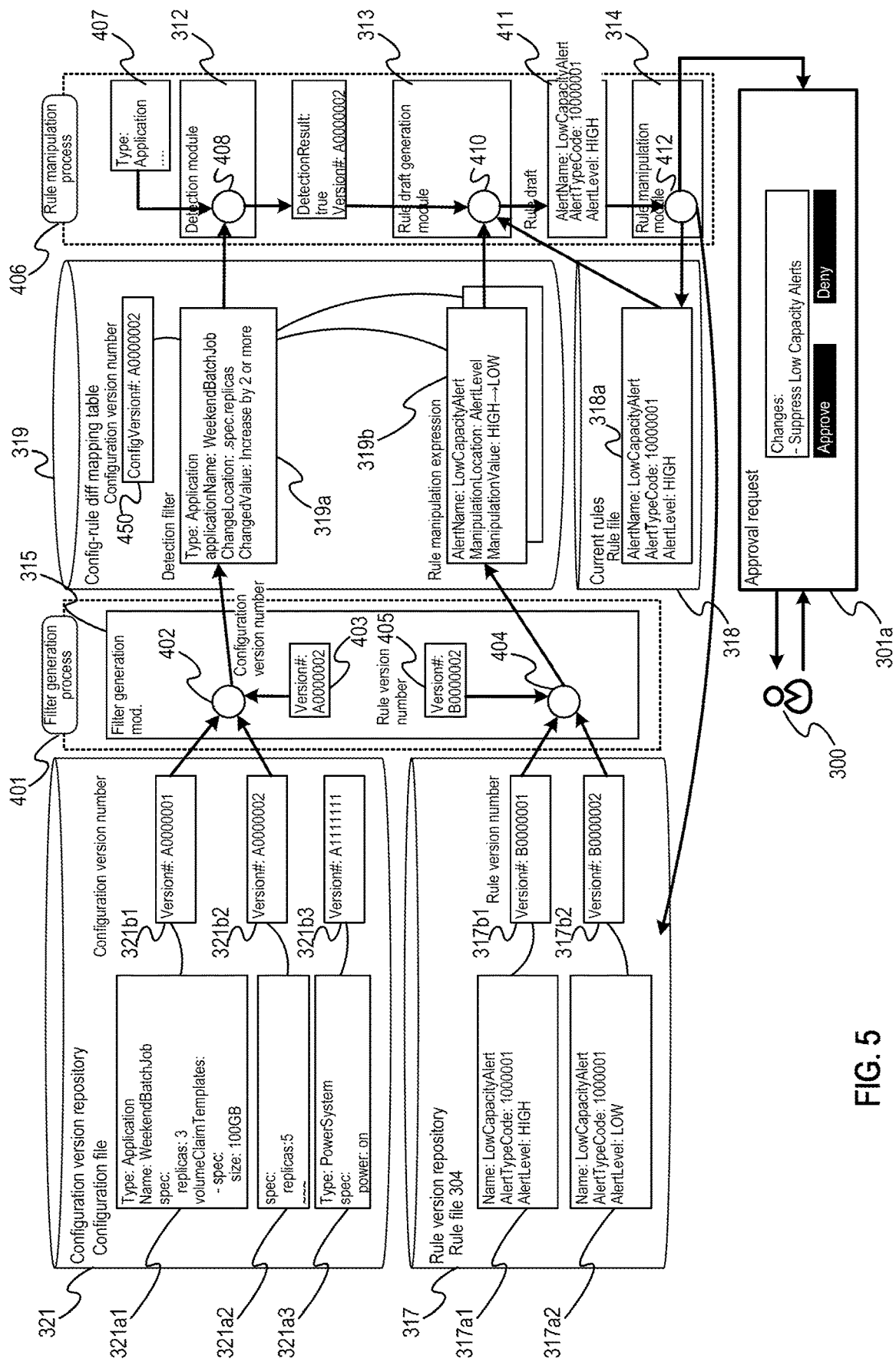
FIG. 5 is a diagram showing an overview about how the rule manipulation system detects temporary configuration change and changes rule used by alert monitoring tool 303 in two processes.

FIG. 5 shows an overview about how the rule manipulation system detects temporary configuration change and changes rule used by alert monitoring tool 303 in two processes. One of the processes is filter generation process 401 and another is rule manipulation process 406. In the filter generation process 401, filter generation module 315 generates detection filter 319a and rule manipulation expression 319b and save them in config-rule diff mapping table 319. In the rule manipulation process 406, detection module 312 and rule draft generation module 313, and rule manipulation module 314 generates rule draft 411 according to information in config-rule diff mapping table 319. Rule draft 411 results in change of current rules 318, and takes effect in alert monitoring tool 303.

In filter generation process 401, filter generation module 315 generates detection filter 319a in function 402. Function 402 loads configuration file 321a and 321b according to configuration version number 403. When configuration version number 403 says "version #: A0000002", function 402 searches the version number in configuration version repository 321. Configuration version repository 321 stores unique configuration version number 321b as index for configuration file 321a1. For example, configuration version number 321b1 "version #: A0000001" is linked to configuration file 321a1, which describes "spec: {replicas: 3}". Configuration version number 321b2 "version #: A0000002" is linked to configuration file 321a2, which describes "spec: {replicas: 5}". Function 402 loads a configuration file linked to the same version as "version #: A0000002" and another configuration file linked to the previous version "version #: A0000001". Function 402 extracts difference between these two files and save it as detection filter 319a. When one configuration file describing "spec: {replicas: 3}" and another configuration file describing "spec: {replicas: 5}" are the input, function 402 outputs "ChangedValue: Increase by 2 or more" and "ChangeLocation: .spec.replicas". ChangeLocation describes where the change is located in configuration file and can be written in the publicly available formats such as jsonpath.

In filter generation process 401, filter generation module 315 generates detection filter 319a in function 404. Function 404 searches rule version repository 317 for rule version number 405. In rule version repository 317, each rule file 317a1 is linked to unique rule version number 317b1. When function 404 searches for rule version number "B0000001", rule version repository 317 returns rule file 317a1 which describes "Name:LowCapacityAlert, AlertLevel: HIGH". This rule means that alert monitoring tool should label the alert type of "LowCapacityAlert" as high-level. In another case, rule version number "B0000002" is linked to the rule file which describes "Name:LowCapacityAlert, AlertLevel: LOW". This rule means that alert monitoring too should label the same alert as "LOW". These rules are different versions of the same rule file. Function 404 loads these two versions of rule file and extract difference to rule manipulation expression 319b. When the rule version number 405 is "Version #: B0000002", the rule manipulation expression will be "AlertName: LowCapacityAlert, ManipulationLocation: AlertLevel, ManipulationValue: HIGH→LOW". The manipulation location shows where the change occurs in rule file 317a1 and the manipulation value shows what are the old value and the new value of the location. So, "HIGH→LOW" means the old value is "HIGH" and this is manipulated to the new value "LOW". This expression allows abstraction of the rule manipulation and reuse of the manipulation to other rule files.

In rule manipulation process 406, detection module 312 receives new configuration files 407 as input from configuration version repository 321 at the timing of change occurrence. New configuration files 407 can include one or multiple configuration files. New configuration files 407 can include historically previous versions which are stored in configuration version repository 321 so that a differentiation between new configuration file and the previous version can be calculated by existing diff tools. This could be before the multiple devices from 323 to 327 reflects the change or after the reflection. It can be triggered another automation tools such as CI/CD or git system which detects changes in other types of configurations. Function 408 in detection module 312 starts to check the input configuration files 407 matches any detection filters in config-rule diff mapping table 319. To do this execution, function 408 can iteratively run the checking program to substitute each of detection filters 319a to input 407 and get the result of Boolean (true/false). In other cases, function 408 can calculate the Boolean result in parallel. This can be done by checking if the differentiation of configuration file 407 is equal to the detection filters 319a. Function 408 outputs nothing or one or more detection results 409. Detection results describes "DetectionResult: true, Version #: A0000002". The result shows the input 407 meets the detection filter 319a linked to the configuration version number 450 of "A0000002". Function 410 receives this results and starts to generates rule draft 411. If the result is nothing, the whole rule manipulation process 406 stops. In other cases, function 410 fetches matched rule manipulation expressions 319b from config-rule diff mapping table 319 according to version number in detection result 409.

Function 410 also fetches rule file from current rule 318. In this step, function 410 can limit an amount of fetching by narrowing target rule files by name or other identifications. After fetching those, function 412 applies all manipulation expressions to current rule file 318a. For example, when the current rule file says "AlertLevel: HIGH" and manipulation expression says "ManipulationLocation: AlertLevel, ManipulationValue: HIGH→LOW", function 410 manipulates rule contents to "AlertLevel: LOW". After the calculation, function 410 generates the rule draft 411. Rule manipulation module 314 can run right after the function 410. In other cases, the rule draft 411 can be sent to another system component such as browser 301a and rule manipulation module can wait for the response. For example, browser 301a can show an approval request view which explains rule draft contents, and asks the storage admin to determine approval or denial. Rule manipulation module 314 gets rule draft 411 and starts function 412. Function 412 saves the rule draft 411 as the newest rule file onto current rule 318. At the same time, function 412 can save the rule draft 411 onto rule version repository 317 as the newest version of rule file.

FIG. 6 shows an example implementation of config-rule diff mapping table 319. As described above, config-rule diff mapping table 319 has detection filters for determining necessity of rule manipulation. Config-rule diff mapping table 319 contains pairs of a detection filter 319a and one or more rule manipulation expressions 319b. In FIG. 6, these pairs are shown as each row in table. Detection filter 319a can contain multiple columns such as config type 501, change location 502, and changed value 503. Rule manipulation expressions 319b can contain multiple columns such as alert type 504, manipulation location 505, and manipulation value 506. 503, 504 and 505 are equivalent to each information in the previous expression of rule manipulation expression like "AlertName: LowCapacityAlert, ManipulationLocation: AlertLevel, ManipulationValue: HIGH→LOW".

In FIG. 6, one row in the table shows that "A0000002" is configuration number version 450 and linked detection filter 319a is "ConfigType: {type: Application, applicationName: WeekendBatchJob}, ChangeLocation: .spec.replicas, ChangedValue: Increase of 2 or more". Further, there are two linked rule manipulation expressions; the first expression is "AlertType: LowCapacitypAlert, ManipulationLocation: AlertLevel, ManipulationValue: HIGH→LOW". The second expression is "AlertType: PowerUsageAlert . . . ". These expressions indicate that one configuration change can result in two or more rule manipulations. Further, the whole row indicates that a change of replica number in application setting named WeekendBatchJob is a temporary change. The expression also indicates that the required rule manipulation will be two; one is rule manipulation for alert type of LowCapacityAlert, and the other is for alert type of PowerUsageAlert. The period of occurrence value for the same row is "1 day".

In another case, when configuration number version 450 is "A1111111" from configuration version number 321b3 and configuration file 321a3, detection filter says "ConfigType: Network Switch, ChangeLocation: .spec.status, ChangedValue: *→PlannedTemporary Shutdown". It indicates that the condition matches when any of network switch configuration is changed to planned temporary shutdown status.

The table can contain period of occurrence column 507. This column contains the duration value such as "1 day" or "1 hour" which shows how long the configuration change expressed by detection filter 319a takes effect. The value can be compared to some threshold like "error budget: 2 days" and it can be used as temporariness. When the period of occurrence is below the threshold, the configuration change will be judged as temporary.

Figure 7:
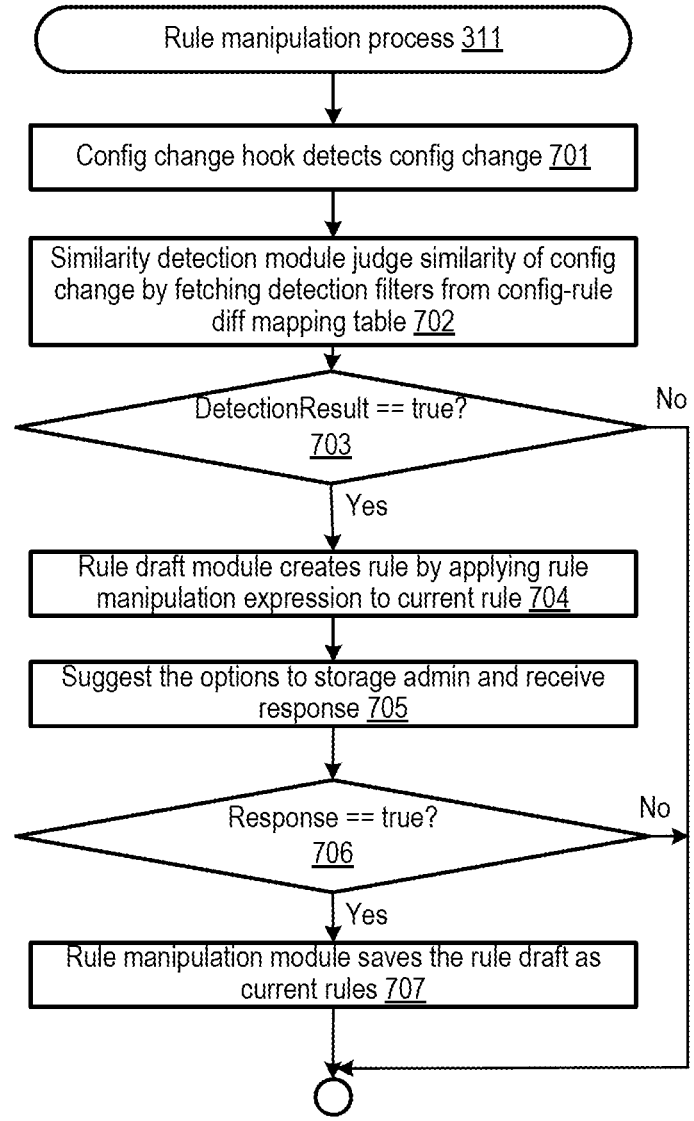
FIG. 7 is a flowchart showing the flows of processes in the example implementation to detect configuration changes and to judge necessity of rule manipulation. Specifically.
Figure 8:
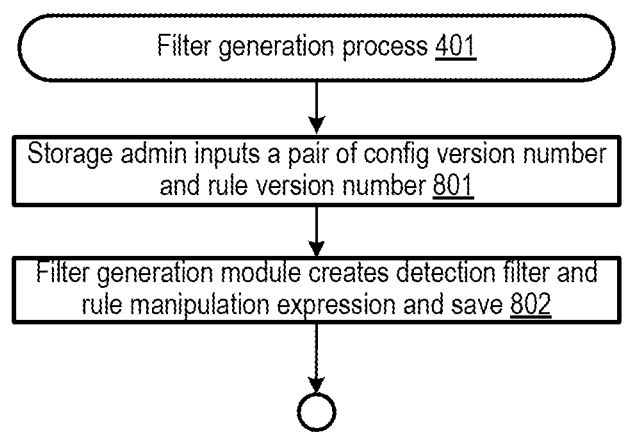
FIG. 8 is a flowchart showing the flows of processes in the example implementation to detect configuration changes and to judge necessity of rule manipulation. Specifically.

FIG. 7 and FIG. 8 show the flows of processes in the example implementation to detect configuration changes and to judge necessity of rule manipulation.

FIG. 7 shows the flows for rule manipulation process 406, in accordance with an example implementation. The configuration version repository 321 send a request to config change webhook 311 when it detects a change at 701. This webhook is a type of uniform resource locator (URL) which can be called through network 322. When the webhook is called, one or more processes in the rule manipulator start. The request to webhook 311 includes a new configuration file 407. Detection module 312 fetches one or more detection filters 319a from config-rule diff mapping table 319 at 702. Detection module 312 applies the detection filters to configuration file 407 to get a result whether configuration file change satisfies detection filter. If the result is true at 703 (Yes), detection module 312 sends detection result 409 which includes detection result "true" and configuration version number 450 linked to detection filter 319a. Rule draft generation module 313 fetches relevant rule manipulation expression 319b from config-rule diff mapping table 319 according to the configuration version number 450 and created a new rule draft 411 at 704. In some cases, rule manipulation module 314 can send a suggestion including rule draft 411 to browser 301a and wait for approval from the storage admin at 705, although this is optional and the rule manipulation can be automatic if desired. The storage admin can view the suggestion on the browser 301a, review if the suggestion is appropriate, and replies true or false as approval/denial at 706. Rule manipulation module 314 receives the reply and if the reply is true (706, Yes), rule manipulation module 314 saves the new rule draft 411 to current rules 318 at 707.

FIG. 8 shows the flows for filter generation process 401, in accordance with an example implementation. The process is to manage config-rule diff mapping table 319. Storage admin calls filter generation module 315 by sending a pair of configuration version number 403 and rule version number 405 at 801. After that, filter generation module 315 runs function 402 and function 404 to generate both of detection filter 319a and rule manipulation expression 319b at 802. With using these information in config-rule diff mapping table 319, rule manipulation process 406 starts to detect temporary changes.

FIG. 9 shows repository setting 329, in accordance with an example implementation. Repository setting 329 stores the address information to connect to multiple configuration version repositories 321. Further, repository setting 329 stores the list of storage devices 304 affected by configuration version repository 321. Repository setting 329 contains three columns: repository name 901, repository URL 902, credential 903 and affected storage devices 904. Repository setting 329 has each row for each configuration version repository 321. For example, one row has "ApplicationConfigurationRepo" as repository name 901, "http://github . . . com/xxxx/yyyy" as repository URL 902, "User: xyz, Password: abc" as credential 903, and "Device1" as affected storage devices 904. This row means that a configuration version repository named "ApplicationConfigurationRepo" resides on the URL "http://github . . . com/xxxx/yyyy". So rule manipulator 310 can fetch any configuration file from the URL. If the credential is not "N/A", rule manipulator 310 can use the credential such as user name, password or access token to access to the URL. If affected storage devices 904 is not "*", which means any devices, this repository is related to some limited storage devices. So, rule manipulator can limit rules to manipulate when receiving the configuration change event 407 from this repository.

Figure 10:
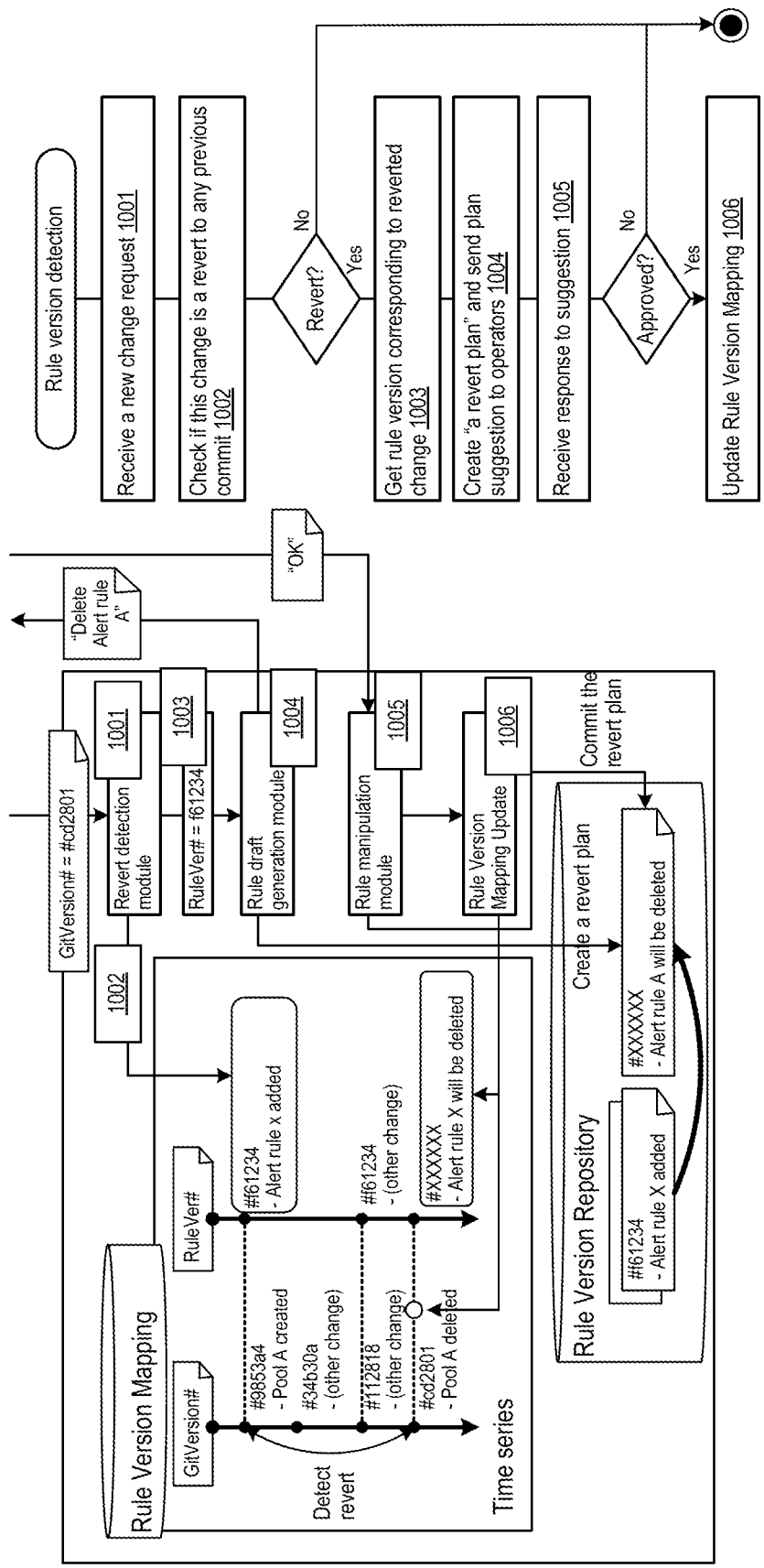
FIG. 10 is a diagram showing revert detection process by revert detection module 330, in accordance with an example implementation.

FIG. 10 shows revert detection process by revert detection module 330, in accordance with an example implementation. Revert detection module 330 receives a new configuration change at config change webhook 311 in the same manner as rule manipulation process in FIG. 7 at 1001. Revert detection module 330 checks if the change is a reversion to the previous commit at 1002. For example, if the commit message in this configure change includes "Revert", then revert detection module 330 judges that the change is a reversion (Yes). Or, if the commit message in this configure change includes "deleted", then revert detection module 330 judges that the change is a reversion (Yes) for reverted previous commit whose message includes "create". Then at 1003, revert detection module 330 searches for the reverted previous commit number. In FIG. 10, the configuration change "#cd2801" is a revert commit for a previous commit "#9853a4". Then at 1004, revert detection module 330 gets revert target rule version linked to the reverted previous commit number. In FIG. 10, revert target rule version is "#f61234" which is linked to "#9853a4". Rule draft generation module 313 generates a new rule draft from the revert target version number. If revert target version number is linked to a rule file "Alert rule X added", rule draft generation module 313 generates a new rule draft reverting the manipulation like "delete an alert rule X". Similarly to FIG. 7, the rule reversion can be done automatically if desired, or the storage admin can be prompted for a response to the suggested rule reversion at 1005. If the storage admin accepts (Yes), then the rule version mapping can be updated at 1006.

Figure 11:
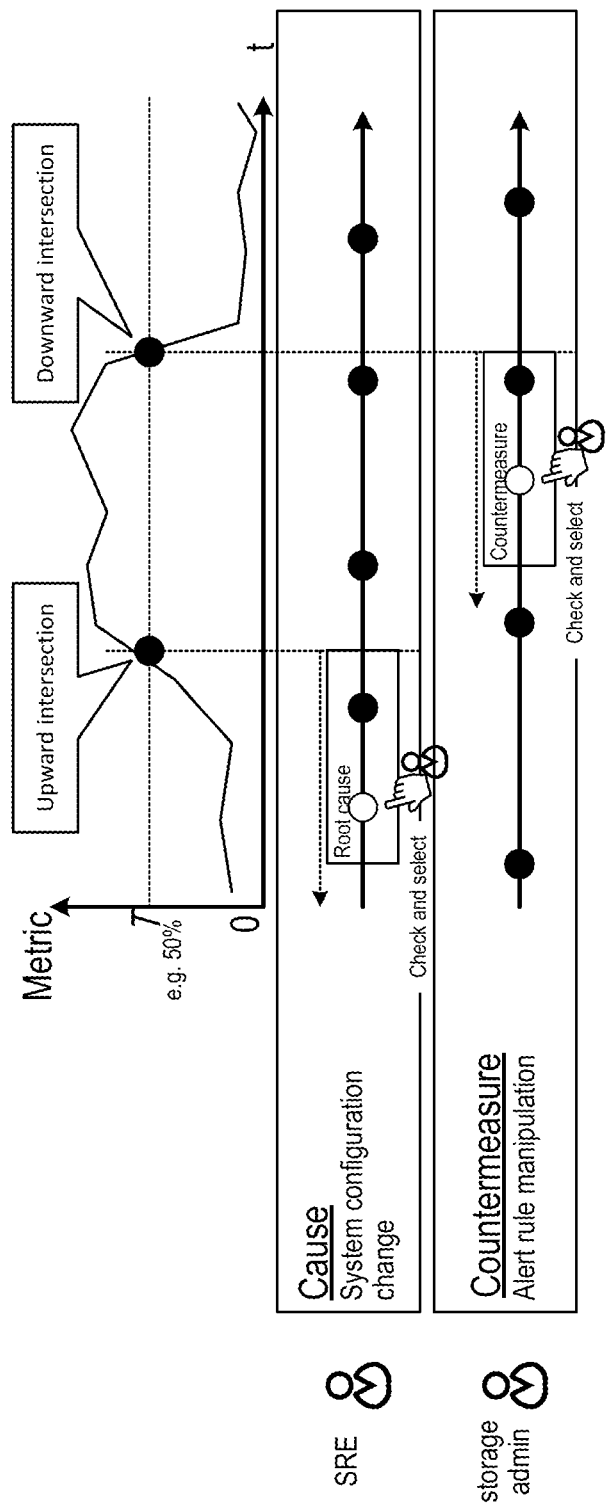
FIG. 11 is a diagram showing time range detection process by time range detection module 331, in accordance with an example implementation.

FIG. 11 shows time range detection process by time range detection module 331, in accordance with an example implementation. This process aims at supporting storage admin and SRE before the filter generation process 401. The time range detection process helps storage admin and SRE to pick up a right pair of configuration version number 403 and rule version number 405 from the history versions. This pair is used as an input to filter generation module 315. In this process, time range detection module 331 creates two time ranges, "cause time range" and "effect time range" to narrow down candidates from all of version histories of configuration and rules.

Time range detection module 331 fetches a time series data from metrics database 320. For example, time series data has tuples of timestamp and value such as a count of PoolThresholdExceed alerts. An example of this data is "2021/08/21 10:00:00, count(PoolThresholdExceed)=3". Then, time range detection module 331 compares it to range detection threshold such as T=2. If the value of time series data exceeds threshold in a short period, the time range detection module 331 calculates the start timestamp and the end time stamp of the time range when the value exceeds the threshold. Start timestamp is expressed as an upward intersection and end timestamp is expressed as a downward intersection in FIG. 11. The output from time range detection 331 is expressed like "upwardIntersection: 2021/08/21 09:30:00, downwardIntersection: 2021/08/21 10:30:00". This period varies from "1 hour" to "3 days". Time range detection module 331 calculates two kinds of time ranges which are "cause time range" and "effect time range" after that.

Cause time range starts at $t_{up}-\Delta t1$, where $t_{up}$ is upward intersection timestamp and $\Delta t1$=10 min. Cause time range ends at $t_{up}$.

Effect time range starts at $t_{down}-\Delta t2$, where $t_{down}$ is downward intersection timestamp and $\Delta t2$=5 min. Cause time range ends at $t_{down}$. Values of $\Delta t1$ and $\Delta t2$ can be changed.

Using these time ranges, rule manipulator can show reduced candidates of versions of configurations, and rules on the browser 301a and helps users (SRE and storage admin) to select a right pair of configuration version and rule version.

Figure 12:
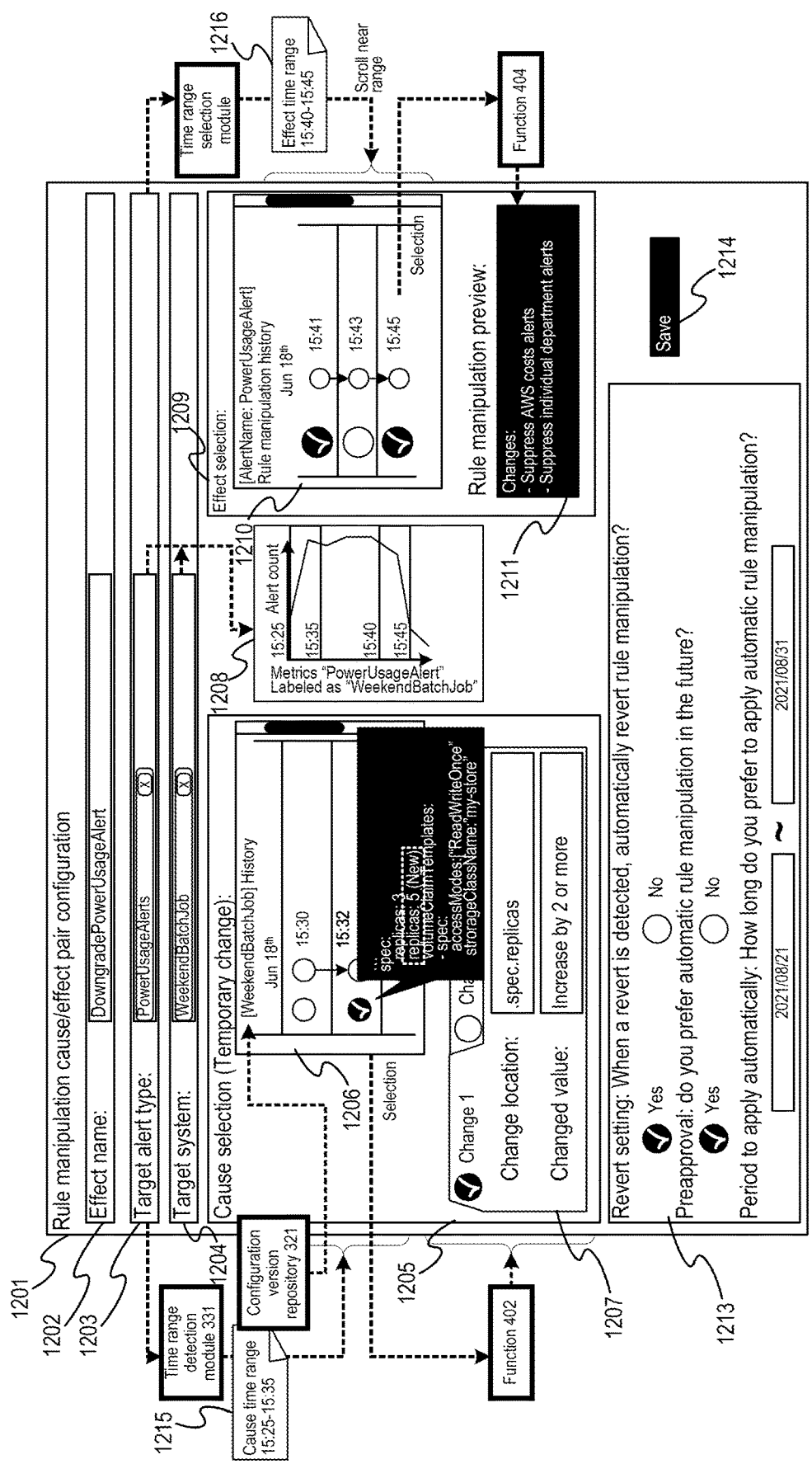
FIG. 12 is a diagram showing user interface (UI) example implementation of browser 301a and browser 301b showing time range detection described in FIG. 11.

FIG. 12 shows a user interface (UI) example implementation of browser 301a and browser 301b showing the time range detection described in FIG. 11. Rule manipulation cause/effect pair configuration 1201 contains effect name field 1202, target alert type field 1203, target system field 1204, cause selection pane 1205, metrics chart 1208, effect selection 1209, option selection UI 1213 and save button 1214. Users such as the storage admin using browser 301a or SRE using browser 301b can input some values into fields from 1202 to 1204. Effect name 1202 is a name to this setting shown in 1201. Target alert type 1203 is used to select the value of target system field 1204, which is used to select time series data from metrics database 320. Cause selection 1205 contains history view 1206 and detailed view 1207. History view 1206 shows some configuration changes (versions) in configuration version repository 321. Detailed view 1207 shows contents of difference which occurred in the version depending on user's selection in history view 1206. Effect selection 1209 has history view 1210 and rule manipulation preview 1211. History view 1210 shows rule version manipulations (versions) in rule version repository 317. Rule manipulation preview 1211 shows difference contents as manipulated in the rule manipulation version. Rule manipulation cause/effect pair configuration UI 1201 gets the cause time range from time range detection module 331 and shows only candidates in the time range in the history view 1206 and history view 1210.

Metrics chart 1208 shows time series data selected by target system and target alert type 1203 in a chart. For example, if a user selects PowerUserAlerts as target alert type and WeekendBatchJob as target system, the chart shows alert counts of PowerUsageAlert in the storage devices which runs application named WeekendBatchJob. Also, the metrics chart 1208 can show the cause time range and the effect time range which time range detection module 331 calculated. Option selection UI 1213 can show optional preference about revert detection described in FIG. 10. This option can include another field to select whether the storage admin should approve rule manipulation after the same temporary change detection in the future. This option preference can also include another field to select a period when rule manipulation automatically applied without storage admin's approval. Save button 1214 allows user to determine the rule manipulation cause/effect pair setting to close.

First, a user fills the fields from 1202 to 1204. Then, time range detection module 331 calculates cause time range 1215 and effect time range 1216. Accordingly, history view 1206 dynamically focuses on the configuration changes in the cause time range 1215. Further, history view 1210 dynamically focuses on the rule manipulations in the effect time range 1216. In this dynamical selection process, rule manipulation cause/effect pair configuration 1201 helps users view a limited number of configurations and rule manipulations and quickens investigation time of these information. Finally, the users set a pair of selected configuration change and rule manipulations. In some cases, this process can be done collaboratively by multiple users. One user (SRE) can select configuration version from history view 1206, and another user (storage admin) can select rule manipulation in history view 1210. This pair is saved into config-rule diff mapping table as the format of detection filter 319a and rule manipulation expression 319b after filter generation process 401. Rule manipulation process 406 uses these saved configuration-rule pairs to detect temporary change in the future and automatically apply rule manipulation to alert monitoring tool 303.

By using rule manipulations as shown in FIGS. 4-9, the example implementations described herein can facilitate automatically detecting temporary change around storage devices, and suggesting new alert rules depending on the change contents.

By using revert detection as shown in FIG. 10, the example implementations facilitate easy automatic rule manipulation in case of the same config changes occurs or the configuration is reverted.

By using the time range detection as shown in FIG. 11 and FIG. 12, the example implementations can help in reducing time consumption for conventional manual rule manipulation for storage device owners.

By using the preapproval option as shown in FIG. 12, the example implementations facilitate automating the storage device owner's task to approve alert rule manipulation for future scheduled maintenance.

Such example implementations benefit users involved in DevOps changes like application scale-out or application deployments, users having unstable environments of networks and power systems, and users using cloud services or other external systems which cannot be controlled fully.

Figure 3:
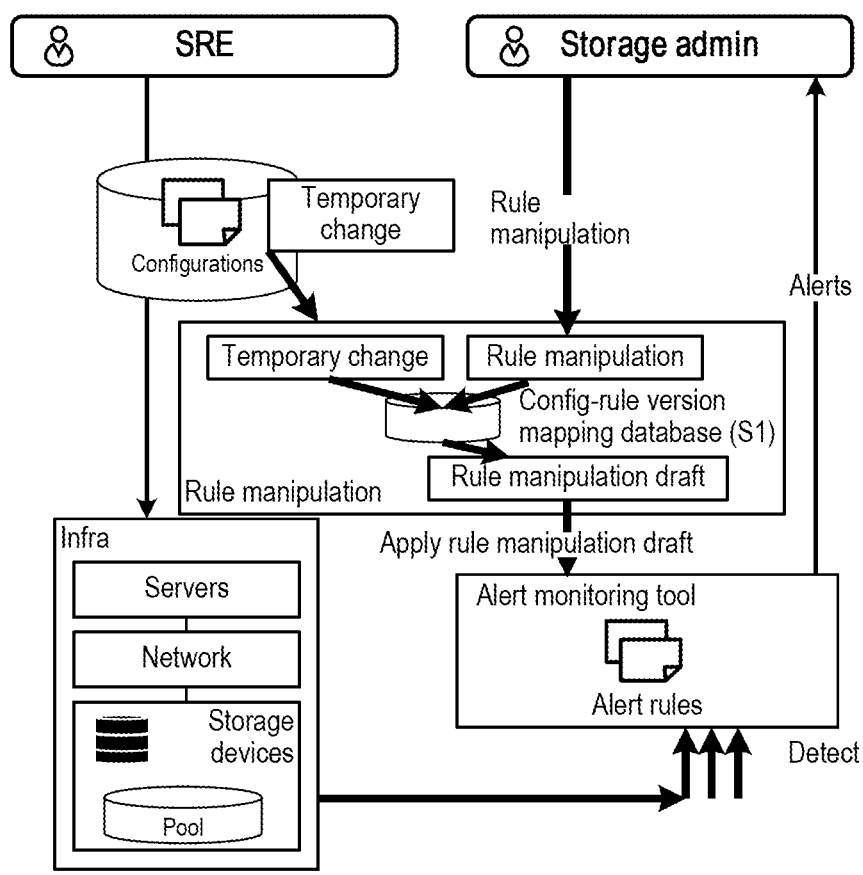
FIG. 3 is a diagram showing the overview of the system in accordance with an example implementation.
Figure 13:
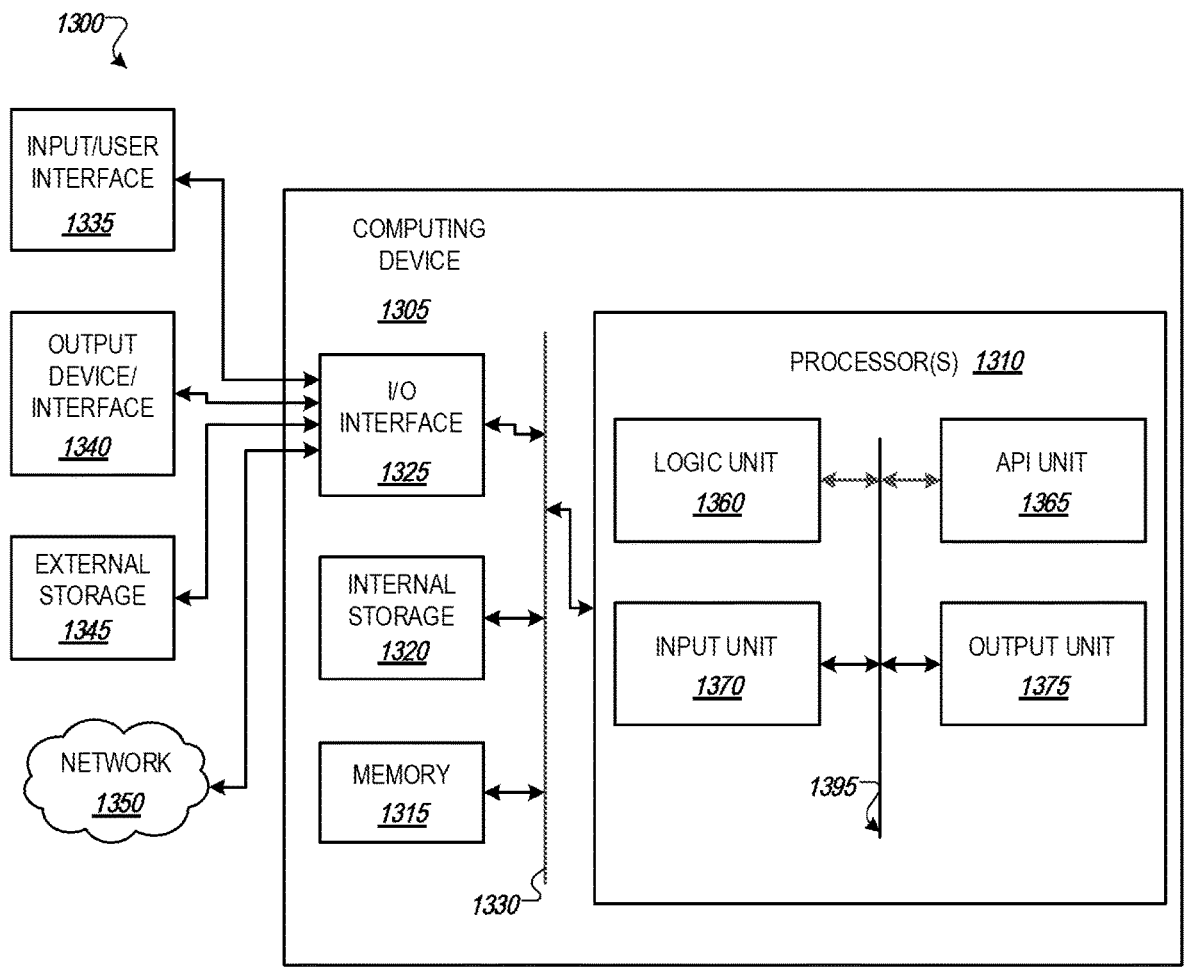
FIG. 13 illustrates an example computing environment with an example computer device suitable for use in some example implementations.

FIG. 13 illustrates an example computing environment with an example computer device suitable for use in some example implementations, such as computing device 302 and/or 309, and/or server 323 of FIG. 3 managing a storage system and one or more devices associated with the storage system, the one or more devices external to the storage system. Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided. Processor(s) 1310 can be in the form of hardware processors such as central processing units (CPUs) or in a combination of hardware and software units.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

Processor(s) 1310 can be configured to execute a method or instructions involving managing a configuration rule difference mapping information (e.g., 311, 319) that maps configuration detection filter information and required rule manipulation responsive to the configuration detection filter information, the required rule manipulation indicative of a modification to alert properties of the storage system; for detection of a configuration change to the one or more devices based on the configuration detection filter information (703, Yes), identifying one or more rule manipulations from the required rule manipulation information from the configuration rule difference mapping information, and generating a rule manipulation draft to modify the alert properties of the storage system based on the required rule manipulation (704) as illustrated in FIGS. 6 and 7.

Depending on the desired implementation, the configuration detection filter information is indicative of possible configuration changes (e.g., 319*a*) to the one or more devices as illustrated in FIG. 6.

Processor(s) 1310 can be configured to execute the method or instructions as described herein, wherein the detection of the configuration change to the one or more devices based on the configuration detection filter information involves identifying the configuration change to the one or more devices based on a configuration version difference (e.g., 321*a*, 321*b*) between the one or more devices as referenced from a version control database (e.g., 321); wherein the identifying the one or more rule manipulations comprises identifying the one or more manipulations corresponding to the configuration version difference as illustrated in FIGS. 3, 9, and 10.

Depending on the desired implementation, the alert properties can involve at least one of an alert frequency, an alert type, or alert contents.

Processor(s) 1310 can be configured to execute the method or instructions as described herein, wherein the alert properties are modified by the storage system based on the required rule manipulation by conducting one or more of filtering alerts, aggregating alerts, muting alerts, modifying alert severity level, or changing alert description as illustrated in FIG. 6. FIG. 6 illustrates examples of reducing the alert severity level (e.g., HIGH→LOW), but other implementations are also possible and the rule manipulation can be set in accordance with any desired implementation. For example, alert frequency can be reduced or increased by filtering specific alerts, aggregating specific alerts, repeating certain alerts, and so on. Other rule manipulations can include muting the alerts (e.g., stopping e-mail notifications/other types of notifications to the storage admin for certain rules), reducing/increasing the alert severity level. Depending on the desired implementation, the content of the alert can also be changed by rule manipulation. For example, rule manipulations can involve changing descriptive information attached with the alert (e.g. add a comment of "this alert came from known temporary change by SRE A").

Processor(s) 1310 can be configured to execute the method or instructions as described herein, wherein the identifying the one or more rule manipulations from the required rule manipulation information from the configuration rule difference mapping information is based on a determination of a first time range of the configuration change and a second time range of rule manipulation causing rule suppression as illustrated in FIG. 11.

Processor(s) 1310 can be configured to execute the method or instructions as described, herein, which can further involve further comprising automatically executing the rule manipulation draft to modify the alert properties of the storage system as illustrated in FIG. 12.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising a storage system and one or more devices associated with the storage system, the one or more devices external to the storage system, the method comprising:
    managing a configuration rule difference mapping information that maps configuration detection filter information and required rule manipulation responsive to the configuration detection filter information, the required rule manipulation indicative of a modification to alert properties of the storage system;
    for detection of a configuration change to the one or more devices based on the configuration detection filter information:
    identifying one or more rule manipulations from the required rule manipulation information from the configuration rule difference mapping information,
    generating a rule manipulation draft to modify the alert properties of the storage system based on the required rule manipulation, and
    automatically executing the rule manipulation draft to modify the alert properties of the storage system by conducting one or more of filtering alerts, aggregating alerts, muting alerts, modifying alert severity level, or changing alert description to prevent occurrence of alert storms.

2. The method of claim 1, wherein the configuration detection filter information is indicative of possible configuration changes to the one or more devices.

3. The method of claim 1, wherein the detection of the configuration change to the one or more devices based on the configuration detection filter information comprises:
    identifying the configuration change to the one or more devices based on a configuration version difference between the one or more devices as referenced from a version control database;
    wherein the identifying the one or more rule manipulations comprises identifying the one or more manipulations corresponding to the configuration version difference.

4. The method of claim 1, wherein the alert properties comprises at least one of an alert frequency, an alert type, or alert contents.

5. The method of claim 1, wherein the identifying the one or more rule manipulations from the required rule manipulation information from the configuration rule difference mapping information is based on a determination of a first time range of the configuration change and a second time range of rule manipulation causing rule suppression.

6. A non-transitory computer readable medium, storing instructions for a system comprising a storage system and one or more devices associated with the storage system, the one or more devices external to the storage system, the instructions comprising:
  managing a configuration rule difference mapping information that maps configuration detection filter information and required rule manipulation responsive to the configuration detection filter information, the required rule manipulation indicative of a modification to alert properties of the storage system;
  for detection of a configuration change to the one or more devices based on the configuration detection filter information:
    identifying one or more rule manipulations from the required rule manipulation information from the configuration rule difference mapping information,
    generating a rule manipulation draft to modify the alert properties of the storage system based on the required rule manipulation, and
    automatically executing the rule manipulation draft to modify the alert properties of the storage system by conducting one or more of filtering alerts, aggregating alerts, muting alerts, modifying alert severity level, or changing alert description to avoid alert storms.

7. The non-transitory computer readable medium of claim 6, wherein the configuration detection filter information is indicative of possible configuration changes to the one or more devices.

8. The non-transitory computer readable medium of claim 6, wherein the detection of the configuration change to the one or more devices based on the configuration detection filter information comprises:
  identifying the configuration change to the one or more devices based on a configuration version difference between the one or more devices as referenced from a version control database;
  wherein the identifying the one or more rule manipulations comprises identifying the one or more manipulations corresponding to the configuration version difference.

9. The non-transitory computer readable medium of claim 6, wherein the alert properties comprises at least one of an alert frequency, an alert type, or alert contents.

10. The non-transitory computer readable medium of claim 6, wherein the identifying the one or more rule manipulations from the required rule manipulation information from the configuration rule difference mapping information is based on a determination of a first time range of the configuration change and a second time range of rule manipulation causing rule suppression.

11. A computing device for a system comprising a storage system and one or more devices associated with the storage system, the one or more devices external to the storage system, the computing device comprising:
  a processor, configured to:
    managing a configuration rule difference mapping information that maps configuration detection filter information and required rule manipulation responsive to the configuration detection filter information, the required rule manipulation indicative of a modification to alert properties of the storage system;
    for detection of a configuration change to the one or more devices based on the configuration detection filter information:
      identifying one or more rule manipulations from the required rule manipulation information from the configuration rule difference mapping information,
      generating a rule manipulation draft to modify the alert properties of the storage system based on the required rule manipulation, and
      automatically executing the rule manipulation draft to modify the alert properties of the storage system by conducting one or more of filtering alerts, aggregating alerts, muting alerts, modifying alert severity level, or changing alert description to avoid alert storms.

* * * * *